INVENTORS
N. M. IMBERTSON
CARL F. DUERING

INVENTORS
N. M. IMBERTSON
CARL F. DUERING

Patented Aug. 16, 1938

2,127,175

UNITED STATES PATENT OFFICE 2,127,175

APPARATUS FOR AND PROCESS OF SOIL CONDITIONING

Norman M. Imbertson and Carl F. Duering, Los Angeles, Calif.

Application March 16, 1935, Serial No. 11,470

10 Claims. (Cl. 61—13)

This application is a continuation in part of our application Serial No. 636,285, entitled "Method of and apparatus for moisture control", filed October 5, 1932.

Our invention has for one of its chief objects the introduction of fluids into soil, and more particularly the introduction of either liquids or gases. This is accomplished by removing the air from the voids or spaces between the particles in the soil, thus decreasing the resistance to the flow of fluids which enter into the voids formerly occupied by the air.

Our invention can be used to introduce any sort of fluid into the soil, but for the sake of convenience the invention will be described only in its preferred embodiment of using water.

The water which is to be introduced into the soil is placed on the surface of the soil, and the air already in the soil is pumped out from under the descending water which then follows into the soil by gravity and pressure differential. We prefer to remove the air by placing a pipe with the intake end at a desired depth in the soil and pumping the air from the voids in the soil out through this pipe. From the above it will be clear that as the air is pumped out through the pipe an air flow is started. It should be clear also that the water which is placed on the soil surface surrounding the pipe is drawn down into the soil as the air (already in the soil) is removed.

It is another object of our invention to pre-wet soils in borrow pits preparatory to placing in compacted dams and embankments. In the method of construction of rolled earth fill dams much progress has been made in recent years. It has been found that a certain moisture content in a soil is conducive to maximum density under a given compacting force for that soil. The problem then is to introduce this proper moisture into the soil preliminary to placing the soil in the dam. Heretofore surface sprinkling, ditching, dyking, etc., have been resorted to in order to pre-wet the soil. This method is not always successful because whenever clay strata or other relatively impervious soils are encountered, they cannot be made to absorb sufficient moisture to be economically handled and placed in a dam. Where the borrow pit is of considerable depth (say twenty feet or more), it is very difficult to introduce moisture into the material comprising the borrow pit in a uniform manner in a limited time. It has been found that as the moisture penetrates the soil (using the ordinary methods of pre-wetting) the air is locked underneath the liquid and acts to retard the flow of the liquid into the soil. This problem is overcome by using our invention which removes the air below the descending liquid, thereby eliminating the retrading action of the air. It has been found in actual practice that the velocity of the liquid penetrating the soil when our invention is in operation is increased to at least three times the velocity obtained under any of the present surface methods of introducing liquid into the soil. For the relatively impervious materials (such as clay) surface sprinkling is absolutely valueless, while the method using this invention is economically practical.

Another object of this invention is to make irrigation positive and rapid, particularly in the more clayey type of soil. By placing the intake end of the pipe at any desired depth in a field or orchard, air is removed down to that depth, and the water follows it. As soon as the water reaches the depth desired, it collects in the pipe and the apparatus starts lifting water, and is then shut off. In this manner moisture can be placed at any desired depth below the surface. Consequently fruit trees or other crops can be irrigated quickly and the moisture can be placed where most desired. The irrigation is not only rapid, but if a quantity of water is placed on the soil which is not sufficient to completely saturate the soil to its full depth, the water can be drawn down so that the surface soil is comparatively dry (approximately 8%) while at the depth desired the soil will have as much as 15% or 20% moisture (by weight). This is very desirable since by drawing the surplus water quickly below the soil much water loss due to surface evaporation is eliminated. Also the ground can be worked almost immediately after an irrigation, since the surface is sufficiently dry and firm to allow the farm equipment to operate. In practice our invention was operated during a period of unusually heavy rainfall when eight inches of rain fell in two weeks. The invention was operated for twenty-four hours after the storm subsided. The second day following this period, it was possible to drive a car over that section of the field where the invention had operated, while anywhere else the car immediately bogged down.

Another object of this invention is to facilitate the irrigating of hilly land. With our invention in operation, the water is absorbed while traveling down the slopes and will not run off as readily as under the ordinary methods.

Another object of this invention is to recondition the tighter soils where a hard pan or sole condition is developed about two feet below the surface of the soil without the necessity of subsoiling. The sole is really a layer of compact soil below the plough depth. Water from an ordinary irrigation or rain will not penetrate it. Consequently the feeder roots of trees or other growth which lie below this hard pan actually suffer from thirst. Our invention in passing the liquid through the sole returns it to a plastic condition and also provides the root systems with the necessary water. Once the sole becomes plastic it is easily penetrated by root systems, and the sole or plough pan reconditions itself.

Following is another purpose for which our invention can be used. In a semi-arid country sufficient rainfall can be captured and placed where desired in the tighter grounds during the wet seasons to allow for the growing of certain crops which could not otherwise be grown. Since the rainfall is not sufficient, it is understood that water would be led to the places to be treated from the surrounding country during the rains so as to provide the surplus water. The invention would draw this surplus water in addition to the ordinary rain water into the ground. Later this water would return slowly to the surface through capillarity and would provide water for the growing of trees or other plants. A test was made with the air intake end of our invention placed twenty feet below the ground, and it was operated only during the rains. In a period of two weeks eight inches of rain fell. The ground section 200 feet from the test had received water to a depth of eight feet. Below that the ground was dry. Within a radius of thirty feet from the apparatus the water was down to a depth of twenty feet, while fifty feet away the water was down to a depth of fourteen. When it is considered that the force necessary to pump the air is between one and two pounds per square inch as shown on the vacuum gage, and that only one ¼-inch tube was used in the test, the practicability of the invention becomes manifest.

A further object of our invention is water conservation. In the countries where water is at a premium, a battery of air pumps pumping air out through deep pipes or wells placed in the alluvial material at the mouths of water sheds could be made to operate during the high run-off, and much water could be placed into underground storage thereby. It is obvious that in water conservation work this invention has possibilities of major importance, particularly in the Southwest where the water table is gradually being lowered.

Another object of this invention is to introduce soluble fertilizers into soils. The fertilizer is first dissolved in water or other liquid, which is then applied to the surface of the soil so as to form an air seal. Then a substantial part of the air in the soil directly beneath said saturated area is exhausted by the use of our invention thereby causing the fluid in said saturated area to penetrate the soil.

Another object of this invention is to recondition alkali lands. This is accomplished by irrigating the alkali lands so as to allow the water to dissolve the alkali. Then the alkali solution is drawn into the deeper sections of the soil below the root systems where it will be harmless to growing crops. This process can be repeated whenever necessary.

A further object of this invention is to kill the stumps of abandoned trees or orchards by introducing carbon disulphide or other chemicals injurious to root systems. The system now in use is to dig two or three holes around the tree and pour carbon disulphide into the holes in the hope that the solution will reach the roots. Many times this operation has to be repeated before it kills the roots. By introducing the carbon disulphide using our invention, a positive diffusion which reaches the roots is certain.

It is a further object of this invention to provide a means of conditioning lawns. This is achieved by a system of perforated pipes laid horizontally about one foot under the lawn, and provides for rapid irrigating, soluble fertilizer feeding, and air feeding.

Another object of this invention is to draw air and/or other gases which may be found beneficial down past the root systems of various types of plant life. This is particularly important in the tighter soils which do not allow sufficient air containing oxygen, nitrogen, carbon dioxide, etc. to get down to the root systems. Experiments whereby air was drawn past the root systems of plants proved conclusively that this means of providing air and/or other gases to plants was beneficial to plant growth. To be more specific, fig slips were successfully started in June using our invention, while similar slips treated identically except that no air was drawn past the root systems died.

Another use of this invention is to induce pre-seasonal growth of plants by introducing warm air through the soil adjacent to the root systems.

The introduction of fresh air into the soil also prevents rot.

Another use for our invention is to recondition sour soil by circulating air through it.

Other objects and advantages of our invention will be obvious from the drawings and specification hereinafter shown, and it is to be understood that although we have described our invention in its preferred embodiments we do not intend to limit ourselves thereto.

Further objects and advantages of the invention will be made evident through the following part of the specification.

Referring to the drawings, which are for illustrative purposes only,

Figure 1:
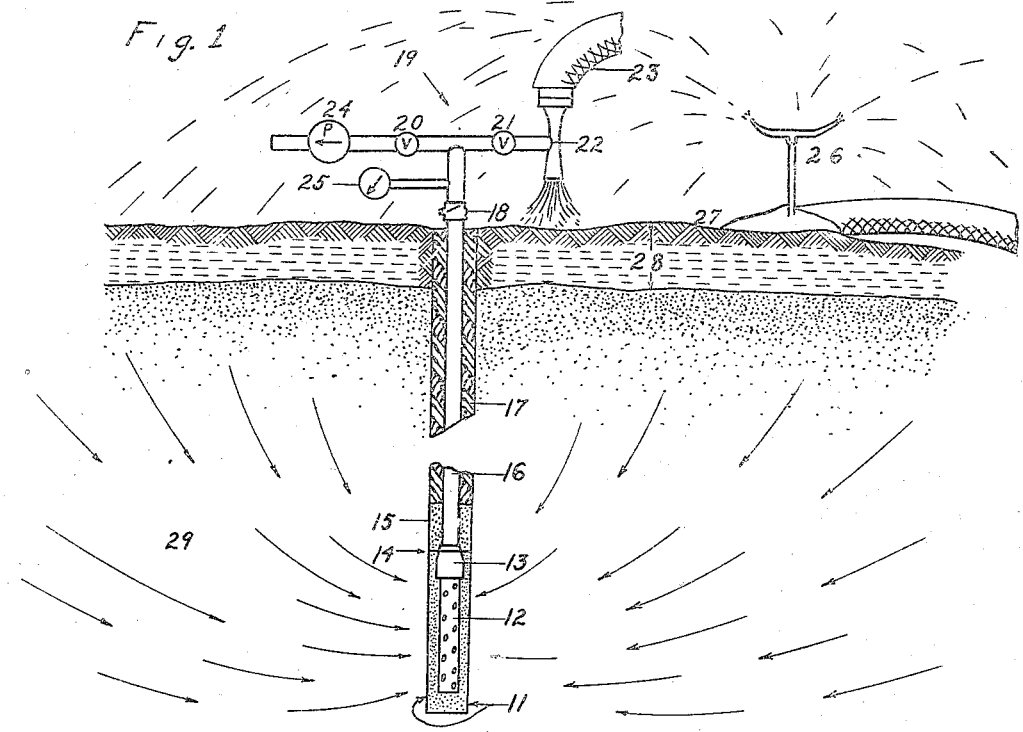
Fig. 1 is a diagrammatic cross sectional view showing a means of introducing liquids into the soil.

As shown in Fig. 1, we provide a hole 11 in the soil to be conditioned. The hole 11 can be of any diameter desired and can be put down to any depth by any suitable method, but in the diagram we show a small hole having a diameter of approximately one inch and a depth of approximately twenty feet. In the hole 11 we provide a pipe 16 which extends downwardly therein and has a perforated portion 12 at its lower end as shown in Fig. 1. The perforated portion 12 may be formed integrally with the pipe 16, or it may be provided as a separate unit attached by a joint 13. In practice pipes 16 and 12 are lowered into the hole 11 and dry cloddy material 15 is then dropped around the pipe in such a manner that the washer or other effective shoulder 14 on the joint 13 keeps it from going to the bottom of the hole 11, and in this manner provides an air space around the perforated pipe 12. In practice this proves practical. An alternative is to put in pea gravel or other porous material and let it fill in around the pipe 12 in the hole 11. This gravel or dry cloddy material 15 is put in until it reaches about a foot above the pipe 12, after which soil 17 is moistened to a plastic condition, and the balance of the hole around the pipe 16 is rammed full of soil 17 which effectively seals off the hole. We prefer to use a rammer of slightly larger internal diameter than the external diameter of the pipe 16, which is slipped over the pipe 16 and removed after packing is completed. After the installation of the pipe 16 we connect to its upper end a pumping device generally indicated at 19. The pumping device may be of any suitable construction, although we prefer to show alternate pumping devices of which 22 is an ejector type capable of creating a partial vacuum in the pipes 16 and 12, and is operative by water or air pressure delivered through hose 23; and 24 is an ordinary air or vacuum pump which creates a partial vacuum in pipes 16 and 12 by pumping or sucking the air out. The pumps are operated separately and are controlled by valves 20 and 21. A check valve 18 holds the partial vacuum in the pipe and soil when the pumps stop. The operating pressure is indicated on the vacuum gage 25. Sprinklers 26 are placed so as to cover completely the ground adjacent to the invention with water or other liquid for a substantial radius which we prefer to be at least 50 feet, but of course any water supply system may be used which is capable of saturating a substantial area of the soil surface surrounding the hole 11. One method found to be very successful is to sprinkle or flood the surface until the water or other liquid has penetrated at least a foot to provide a saturated area 28 in the soil. Then the air pumping device 19 is put into operation creating a partial vacuum in the pipe 12, and this air is discharged at 22 or 24. As air 29 is removed from the soil through the perforated portion 12 and pipe 16, the water 28 follows down into the soil rapidly from the surface as the pores in the soil are no longer air locked and there is a pressure differential between the saturated and unsaturated portions of the soil. In actual practice the setup as described will allow water to penetrate soil of semi pervious material at least three times as fast as it would under ordinary conditions and from ten to fifty times as fast in a relatively impervious material such as clay.

Figure 2:
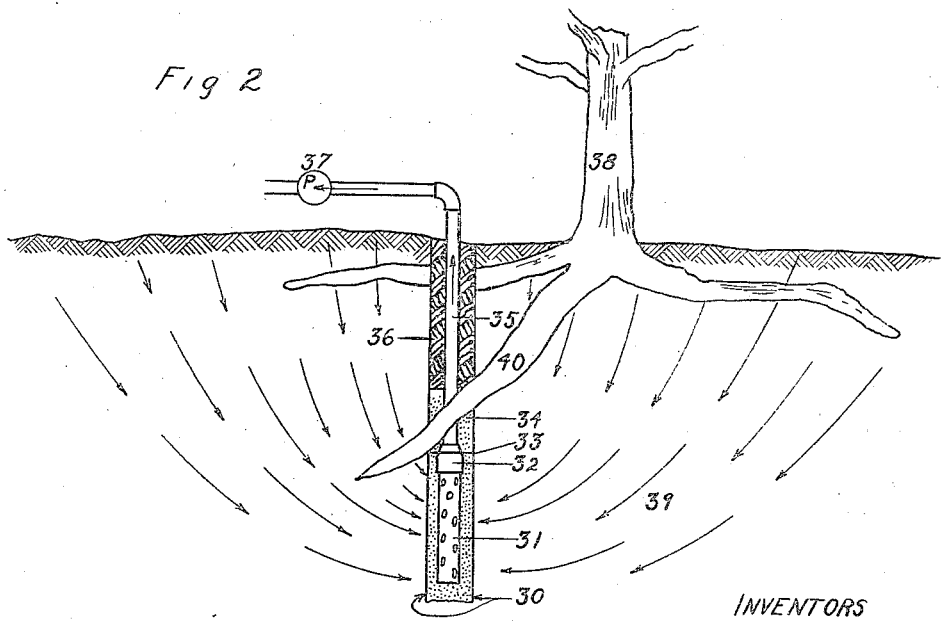
Fig. 2 is a similar cross section showing a form of the application of the invention as applied to irrigation.

In Fig. 2 we show an alternative embodiment of our invention which finds its chief utility in irrigation. A hole 30 is put down to any desired depth. The pipe 35 extends downwardly in the hole 30 and has a perforated portion 31 at its lower end. This perforated portion may be integral with the pipe 35, or it may be provided as a separate unit attached at the joint 32. The pipe is installed and sealed off as in Fig. 1 with 33, 34 and 36 being the washer, dry cloddy material, and plastic material respectively. The air pump 37 pumps air 39 from the soil, and the liquids or gases existing or placed on the surface follow down into the evacuated soil voids and feed the root system 40 of tree 38. By the use of the installation shown in Fig. 2, water, carbon disulphide solution, fertilizers in solution, insecticide solutions, alkali solutions, and other liquids may be drawn down to any desired depth into soil past the root systems of trees or other plant growth.

Another alternative embodiment of our invention may be practiced by omitting to saturate the surface of the ground with a liquid before operating the pumping means 37. The air 39 in the ground is then pumped out and is replaced by fresh air from the surface.

Other gases heavier than air can also be introduced into the soil by this means. As in Fig. 1, it should be understood that means must be provided to cover the surface with the liquid or gases to be introduced into the soil.

Figure 3:
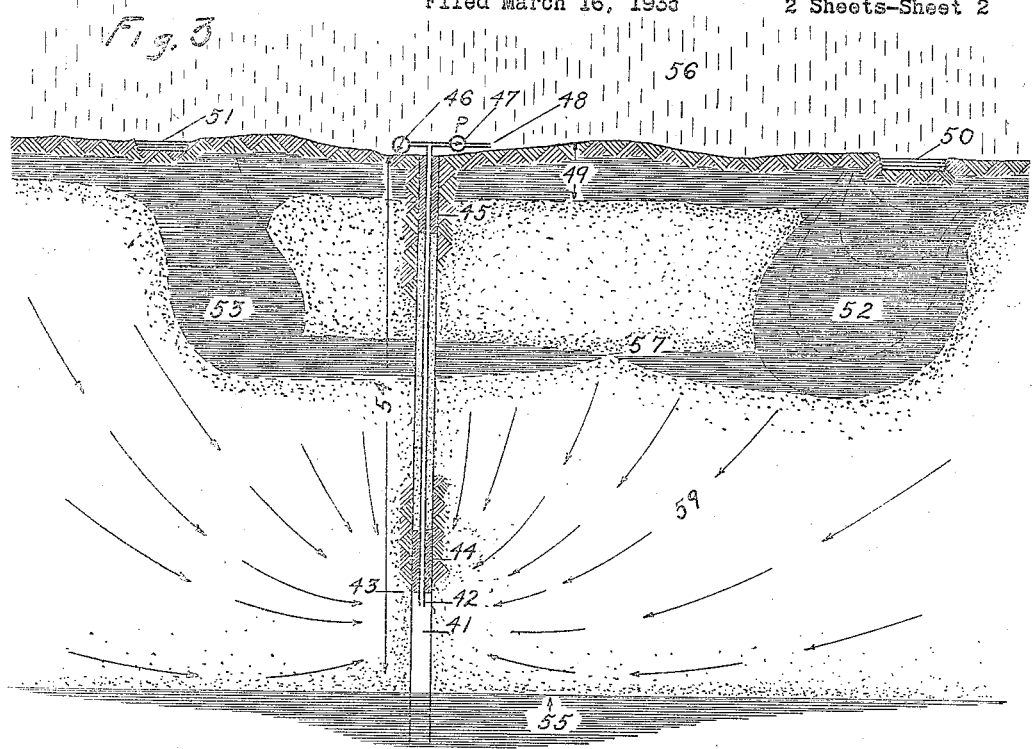
Fig. 3 is another embodiment of our invention showing a means of building up the ground water table during the rainy season.

An alternative embodiment of our invention is shown in Fig. 3, in which the lower portion of a well 41 of any desired dimensions is connected by a large capacity pipe 42 which extends to the surface of the ground and is connected to an air pump 47 of large capacity. The pipe 42 is sealed off at 44 and 45 so that when air is pumped into the pipe at 42, it must come from the soil 59. The means of sealing may vary with the type of well. During rain storms and after the rain 56 has wet the soil to a depth of three inches or more to form a relatively saturated layer 49, the pump 47 is started and the air 59 is exhausted from the soil causing the water to sink rapidly into the evacuated soil voids. The pump is operated for some time after the storm, and the water works its way down deeper into the soil being replaced by air at the surface. The water in the ditches 50 and 51 continues to enter the ground from the surface forming gradually increasing saturated zones as shown by 52 and 53. The water surface is shown at the start of pumping by the layer 49, while 57 indicates the surface water after it has been pulled down into the soil to a considerable depth and just before the saturated zone divides, which allows the air to come directly from the surface and effectively stops the process. This can be detected by the vacuum gage 46. The process is repeated during each storm and can be continued for a few days afterwards. The depth of the well 54 may vary with the soil formation and the pump capacity. The results obtained can be checked by reading the water table elevation 55 if there is one.

Figure 4:
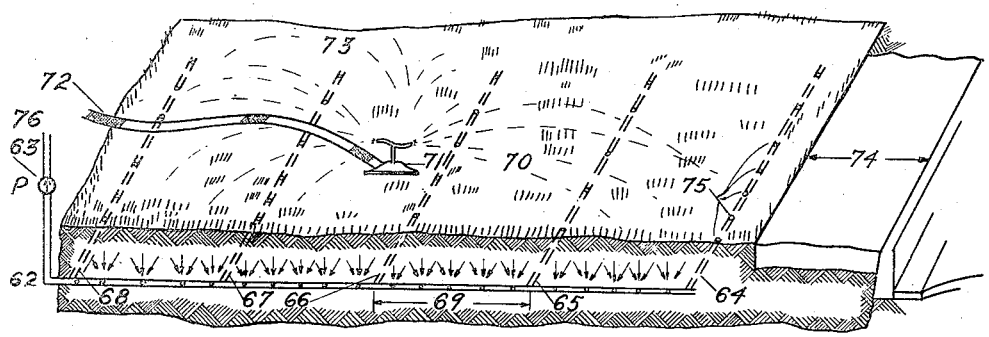
Fig. 4 is an embodiment of the invention which finds its chief utility in introducing water, air, and fertilizer solutions, etc., into lawns, shrubbery, gardens, etc.

In Fig. 4 another form of our invention is shown in which a suitable air pump 63 pumps air from under the lawn 70 through the pipe perforations 75 into the pipe system 62, and 64 to 68 inclusive. The pipes are so placed so as to give the desired results. The distance 69 is a variable and depends on the depth at which the pipes are buried. In practice air is pumped out through pipe 62 by pump 63 and discharged at 76. A principal use of this lawn system is to irrigate lawns by sprinkling water 73 through a hose or other means 72 connected to a sprinkler of any type 71, and then to remove the air resistance in the soil by pumping the air out from under the saturated lawn thereby causing the water to penetrate into the soil at a rapid rate. When the lawn needs plant foods, soluble fertilizers are placed in solution over the lawn and then drawn down past the root systems by pumping the air out of the soil thus allowing the soluble fertilizers to sink on down into the soil where the grass roots can feed upon them. By operating the pump only during the heat of the day (particularly in the spring and fall) warm air is drawn through the grass or lawn roots, and the rate of growth is increased by warming the lawn soil and providing a ready supply of air to the root systems of the lawn.

We claim as our invention:

1. A method of moving liquid into a mass of earthy material which is of such moisture content as to have a plurality of voids dispersed therein, comprising the steps of: applying the liquid to a surface of said mass to form a fluid seal at said surface; exhausting a substantial portion of the gas content from the voids in the zone of said mass adjacent said surface to lower the pressure therein; and maintaining the lowered pressure in said zone until liquid from said surface has moved a desired distance into said mass.

2. A method of conditioning soil by moving a gas downwardly from the surface thereof, comprising the steps of: exposing said surface of said soil to said gas; forming a chamber in said soil in spaced relation to said surface and in communication with said soil; applying suction to said chamber, which suction will be transmitted from said chamber to said soil to reduce the pressure therein; and maintaining said suction for a period of time sufficient to cause said gas to move downwardly a distance into said soil.

3. A method of conditioning a soil which lies above the water table, including the steps of: dissolving a soluble substance such as a fertilizer in a liquid; applying said liquid to the surface of said soil so as to form an air seal; and exhausting a substantial part of the air in said voids beneath said seal so as to cause said liquid to penetrate to a substantial depth in said material.

4. A method of removing harmful, undesirable substances, such as alkali, from the surface layer of a contaminated soil, comprising the steps of: applying to the surface of the soil a sufficient amount of water to dissolve a material portion of said undesirable substance; forming a chamber in the soil in a position spaced from said surface layer and in communication with the soil; applying suction to said chamber and thereby transmitting a reduced pressure to said soil to cause said water to move downwardly from said surface of said soil; and maintaining said suction until a substantial portion of said water and the substance dissolved therein have moved through said soil to a plane below said surface layer.

5. A method of conditioning, to any depth, a soil lying above the water table containing a plurality of air-filled voids, including the steps of: saturating an area of the surface of said soil with water so as to form a water seal; and exhausting a substantial portion of the air in a zone in said soil beneath said seal so as to cause the fluid comprising said seal to penetrate into said zone from which the air has been exhausted.

6. In a soil conditioning device of the character described, the combination of: a tubular member extending from the exterior of said soil to the interior thereof, the inner portion of said tubular member having an opening communicating with the soil; sealing means around said tubular member in a position between said opening and the surface of the soil; an exhaust pump connected to said tubular member to produce a suction at said opening to reduce the pressure in the soil; and means operating to apply liquid to the surface of said soil.

7. A method of conditioning a body of relatively dry earthy material, comprising the steps of: applying a fluid to the surface of said body; forming a chamber within said body at a distance from said surface and in open communication with earthy material lying adjacent thereto; and applying suction to said chamber to reduce the pressure in said chamber so as to draw gas from said earthy material of said body, thereby reducing the pressure therein and drawing fluid from said surface and into said earthy material.

8. A method of distributing a desired fluid content in a mass of earthy material having a multiplicity of gas filled voids therein, comprising the steps of: applying a desired fluid to a surface of said mass; and applying a suction to said mass, at a position spaced from said surface, to draw gas from the said earthy material lying between said position and said surface and to thereby move said fluid from said surface toward said position.

9. A method of distributing a desired liquid content in a portion of a mass of earthy material of such dryness as to have gas filled voids therein, comprising the steps of: applying a layer of liquid to the surface of said mass; and applying, at a position within said mass, a suction to draw gas from the earthy material adjacent said position and between said position and said surface and to thereby move said liquid from said surface layer into said mass of earthy material.

10. In means for distributing a fluid through a mass of earth material of such character as to resist the entry of the fluid into the mass by percolation from a surface thereof, the combination of: fluid applying means operative to apply a quantity of fluid to one portion of said mass of earth material; a suction member disposed in contact with said mass of earth material in a position spaced from said portion of said mass to which said fluid is applied by said fluid applying means, said suction member having an opening in direct communication with said mass through which a suction may be transmitted to said mass; and an exhausting member connected to said suction member so as to remove the gases therefrom and create a partial vacuum in said suction member, said partial vacuum being transmitted through said opening into said mass so as to reduce the pressure in said mass and cause said fluid to move in said mass toward said suction means.

NORMAN M. IMBERTSON.
CARL F. DUERING.